US012618481B2

(12) United States Patent
Knoles et al.

(10) Patent No.: US 12,618,481 B2
(45) Date of Patent: May 5, 2026

(54) DIAPHRAGM BEAD CONFIGURATION

(71) Applicant: Acorn Engineering Company, Inc.,
City of Industry, CA (US)

(72) Inventors: Edward Barry Knoles, Duarte, CA
(US); Adrian Alexander Filip, Corona,
CA (US); Kevin Thomas Hamlett,
Highland, CA (US)

(73) Assignee: Acorn Engineering Company, Inc.,
City of Industry, CA (US)

( * ) Notice: Subject to any disclaimer, the term of this
patent is extended or adjusted under 35
U.S.C. 154(b) by 0 days.

(21) Appl. No.: 18/369,760

(22) Filed: Sep. 18, 2023

(65) Prior Publication Data

US 2024/0093791 A1      Mar. 21, 2024

Related U.S. Application Data

(60) Provisional application No. 63/407,448, filed on Sep.
16, 2022.

(51) Int. Cl.
| | |
|---|---|
| F16K 17/08 | (2006.01) |
| F16K 7/12 | (2006.01) |
| F16K 7/16 | (2006.01) |

(52) U.S. Cl.
CPC .................. F16K 7/16 (2013.01); F16K 7/12
(2013.01); F16K 17/085 (2013.01)

(58) Field of Classification Search
CPC . F16K 17/085; F16K 7/12; F16K 7/16; F16K
7/17; F16J 15/35; F16J 15/52
USPC .................................. 277/315, 389, 391, 634
See application file for complete search history.

(56) References Cited

U.S. PATENT DOCUMENTS

| | | | |
|---|---|---|---|
| 3,154,286 A | 10/1964 | McFarland, Jr. | |
| 3,701,360 A | 10/1972 | Morrison | |
| 4,887,516 A | * 12/1989 | Scott | F01B 19/02 |
| | | | 92/100 |
| 5,031,875 A | 7/1991 | Zimmerman | |
| 5,320,024 A | 6/1994 | Wagner et al. | |
| 6,286,533 B1 | 9/2001 | Goncze | |
| 7,634,962 B2 | 12/2009 | Muller | |
| 9,896,829 B2 | 2/2018 | Davis et al. | |
| 10,087,804 B2 | 10/2018 | Muntean et al. | |

(Continued)

FOREIGN PATENT DOCUMENTS

| | | |
|---|---|---|
| CA | 2048410 A1 | 2/1992 |
| CN | 210218822 U | 3/2020 |

(Continued)

OTHER PUBLICATIONS

Machine English translation of DK202001100A1 (Year: 2024).*

(Continued)

*Primary Examiner* — Hailey K. Do
(74) *Attorney, Agent, or Firm* — The Webb Law Firm

(57)      ABSTRACT

A valve diaphragm for a relief valve may include: a body
having a first beaded end and a second beaded end, the first
beaded end having a bottom surface and a bulge extending
from the bottom surface. The bottom surface may be con-
figured to contact a first portion of a corner of a lower valve
body, and the bulge is configured to contact a step of an
upper valve body, and the engagements of the bottom
surface, the first portion of the corner, the bulge, and the step
may be configured to create a fluid tight seal between the
upper valve body and the lower valve body.

17 Claims, 8 Drawing Sheets

(56)         References Cited

U.S. PATENT DOCUMENTS

| | | | | |
|---|---|---|---|---|
| 2013/0298758 A1* | 11/2013 | Shigeta | ...................... | F16J 3/02 |
| | | | | 92/48 |
| 2021/0381869 A1 | 12/2021 | Rabhi | | |
| 2022/0042481 A1 | 2/2022 | Ryu et al. | | |
| 2023/0062647 A1 | 3/2023 | Sasao | | |
| 2023/0194010 A1 | 6/2023 | Kostanski et al. | | |
| 2023/0204115 A1 | 6/2023 | Fisch | | |
| 2023/0249661 A1 | 8/2023 | Arangarasan et al. | | |

FOREIGN PATENT DOCUMENTS

| | | | | | |
|---|---|---|---|---|---|
| CN | 111810642 A | * | 10/2020 | ........... | F16J 15/3284 |
| DK | 202001100 A1 | * | 11/2021 | | |
| EP | 0598252 B1 | | 5/1994 | | |
| ES | 359035 A1 | * | 5/1970 | | |
| KR | 20090102144 A | * | 9/2009 | | |

OTHER PUBLICATIONS

Machine English translation of KR20090102144A (Year: 2024).*
Machine English translation of ES359035A1 (Year: 2024).*
Machine English translation of CN-111810642-A (Year: 2025).*

\* cited by examiner

DIAPHRAGM BEAD CONFIGURATION

CROSS REFERENCE TO RELATED APPLICATIONS

This application claims priority to U.S. Provisional Patent Application Ser. No. 63/407,448, titled "Diaphragm Bead Configuration" and filed on Sep. 16, 2022, the disclosure of which is incorporated herein in its entirety.

BACKGROUND OF THE INVENTION

Field of the Invention

This disclosure pertains to a valve diaphragm having a beaded end designed to make the diaphragm easier to install and more difficult to damage in operation.

Description of Related Art

Valve diaphragms are used to maintain a seal between different valve elements. They typically require a very precise fit with the features of the valves with which they engage. Such a fit requires precise machining of the different valve parts so that they can take a shape that is at least partially complimentary to that of the diaphragm, particularly at the ends of the diaphragm where sealing characteristics may be most important. This machining can often be difficult and expensive. It may also result in a fit between the valve and diaphragm that increases the potential for the fluid tight seal to be broken.

Thus, there is a need to have a valve diaphragm that includes an end shape that allows for simpler machining of valve body parts, allows for an easier fit between the end of the diaphragm and the valve body parts, and to better protect the diaphragm from damage during use.

SUMMARY OF THE INVENTION

In one embodiment or aspect, a valve diaphragm for a relief valve may include: a body having a first beaded end and a second beaded end, the first beaded end having a bottom surface and a bulge extending from the bottom surface. The bottom surface may be configured to contact a first portion of a corner of a lower valve body, and the bulge is configured to contact a step of an upper valve body, and the engagements of the bottom surface, the first portion of the corner, the bulge, and the step are configured to create a fluid tight seal between the upper valve body and the lower valve body.

The body may be compressible, such that the step is configured to compress the bulge in the direction of the bottom surface. The corner and the step may be arranged to define a bead cavity, the bead cavity being configured to hold the first beaded end, and wherein the bead cavity may be shaped such that when the bulge is compressed and the fluid tight seal is formed, the bead cavity defines an empty space with the first beaded end. The body may further include a tail extending from the first beaded end proximate the bulge. The tail may be configured to contact a second portion of the corner. The second portion of the corner may be configured to compress the tail into the first beaded end. The second portion of the corner may be arranged perpendicularly to the first portion of the corner. The second beaded end may be configured to contact a portion of the valve stem. The second beaded end may include a rounded end extending in a direction opposite that of the bulge. The body may define a U-shaped bend between the first beaded end and the second beaded end. The U-shaped bend may define a first level and a second level, the first level being arranged higher than the second level, and the first beaded end may be located at the first level, and the second beaded end is located at the second level. At least a portion of a first side of the U-shaped bend may contact the lower valve body. At least a portion of a second side of the U-shaped bend may contact a valve stem. The second side may oppose the first side.

In another embodiment or aspect, a relief valve may include: an upper valve body; a lower valve body at least partially defining a fluid flow path; a stem configured to move between the upper valve body and the lower valve body, the stem at least partially extending into the fluid flow path; and a diaphragm disposed between the upper valve body and the lower valve body, the diaphragm including a body having a first beaded end and a second beaded end, the body defining an aperture to receive at least a portion of the stem therethrough. The first beaded end may include a bottom surface and a bulge extending from the bottom surface. The bottom surface may be configured to contact a first portion of a corner defined in the lower valve body. The bulge may be configured to contact a step defined in the upper valve body. The upper valve body and the lower valve body may be arranged such that the contact between the first portion of the corner and the bottom surface and the contact between the bulge and the step are configured to create a fluid tight seal between the upper valve body and the lower valve body.

The diaphragm may be compressible, such that the step compresses the bulge in the direction of the lower valve body. The body may further include a tail extending from the first beaded end proximate the bulge, and the tail may be configured to contact a second portion of the corner, the second portion arranged perpendicularly to the first portion. The corner and the step may be arranged to define a bead cavity, the bead cavity being configured to hold the first beaded end, and the bead cavity may be shaped such that when the bulge is compressed and the fluid tight seal is formed, the bead cavity defines an empty space with the first beaded end. The second beaded end may be configured to be received within a portion of the valve stem. The body may define a U-shaped bend between the first beaded end and the second beaded end, the U-shaped bend defining a first level and a second level, the first level arranged higher than the second level, and the first beaded end may be located at the first level, and the second beaded end may be located at the second level.

In some embodiments or aspects, the present disclosure can be characterized by the following clauses.

Clause 1. A valve diaphragm for a relief valve, the valve diaphragm comprising: a body comprising a first beaded end and a second beaded end, the first beaded end comprising a bottom surface and a bulge extending from the bottom surface, wherein the bottom surface is configured to contact a first portion of a corner of a lower valve body, and the bulge is configured to contact a step of an upper valve body, and wherein the engagements of the bottom surface, the first portion of the corner, the bulge, and the step are configured to create a fluid tight seal between the upper valve body and the lower valve body.

Clause 2. The valve diaphragm of clause 1, wherein the body is compressible, such that the step is configured to compress the bulge in the direction of the bottom surface.

Clause 3. The valve diaphragm of clause 2, wherein the corner and the step are arranged to define a bead cavity, the bead cavity being configured to hold the first beaded end, and wherein the bead cavity is shaped such that when the bulge is compressed and the fluid tight seal is formed, the bead cavity defines an empty space with the first beaded end.

Clause 4. The valve diaphragm of clause 2 or 3, wherein the body further comprises a tail extending from the first beaded end proximate the bulge.

Clause 5. The valve diaphragm of clause 4, wherein the tail is configured to contact a second portion of the corner.

Clause 6. The valve diaphragm of clause 5, wherein the second portion of the corner is configured to compress the tail into the first beaded end.

Clause 7. The valve diaphragm of clause 5, wherein the second portion of the corner is arranged perpendicularly to the first portion of the corner.

Clause 8. The valve diaphragm of any of clauses 1-7, wherein the second beaded end is configured to contact a portion of a valve stem.

Clause 9. The valve diaphragm of clause 8, wherein the second beaded end comprises a rounded end extending in a direction opposite that of the bulge.

Clause 10. The valve diaphragm of any of clauses 1-9, wherein the body defines a U-shaped bend between the first beaded end and the second beaded end.

Clause 11. The valve diaphragm of clause 10, wherein the U-shaped bend defines a first level and a second level, the first level being arranged higher than the second level, and wherein the first beaded end is located at the first level, and the second beaded end is located at the second level.

Clause 12. The valve diaphragm of clause 11, wherein at least a portion of a first side of the U-shaped bend contacts the lower valve body.

Clause 13. The valve diaphragm of clause 12, wherein at least a portion of a second side of the U-shaped bend contacts a valve stem.

Clause 14. The valve diaphragm of clause 13, wherein the second side opposes the first side.

Clause 15. A relief valve comprising: an upper valve body; a lower valve body at least partially defining a fluid flow path; a stem configured to move between the upper valve body and the lower valve body, the stem at least partially extending into the fluid flow path; and a diaphragm disposed between the upper valve body and the lower valve body, the diaphragm comprising a body having a first beaded end and a second beaded end, the body defining an aperture to receive at least a portion of the stem therethrough, wherein the first beaded end comprises a bottom surface and a bulge extending from the bottom surface, wherein the bottom surface is configured to contact a first portion of a corner defined in the lower valve body, wherein the bulge is configured to contact a step defined in the upper valve body, and wherein the upper valve body and the lower valve body are arranged such that the contact between the first portion of the corner and the bottom surface and the contact between the bulge and the step are configured to create a fluid tight seal between the upper valve body and the lower valve body.

Clause 16. The relief valve of clause 15, wherein the diaphragm is compressible, such that the step compresses the bulge in the direction of the lower valve body.

Clause 17. The relief valve of clause 16, wherein the body further comprises a tail extending from the first beaded end proximate the bulge, and wherein the tail is configured to contact a second portion of the corner, the second portion arranged perpendicularly to the first portion.

Clause 18. The relief valve of clause 16 or 17, wherein the corner and the step are arranged to define a bead cavity, the bead cavity being configured to hold the first beaded end, and wherein the bead cavity is shaped such that when the bulge is compressed and the fluid tight seal is formed, the bead cavity defines an empty space with the first beaded end.

Clause 19. The relief valve of any of clauses 15-18, wherein the second beaded end is configured to be received within a portion of the valve stem.

Clause 20. The relief valve of any of clauses 15-19, wherein the body defines a U-shaped bend between the first beaded end and the second beaded end, the U-shaped bend defining a first level and a second level, the first level arranged higher than the second level, and wherein the first beaded end is located at the first level, and the second beaded end is located at the second level.

BRIEF DESCRIPTION OF THE DRAWING(S)

DESCRIPTION OF THE INVENTION

Figure 1:
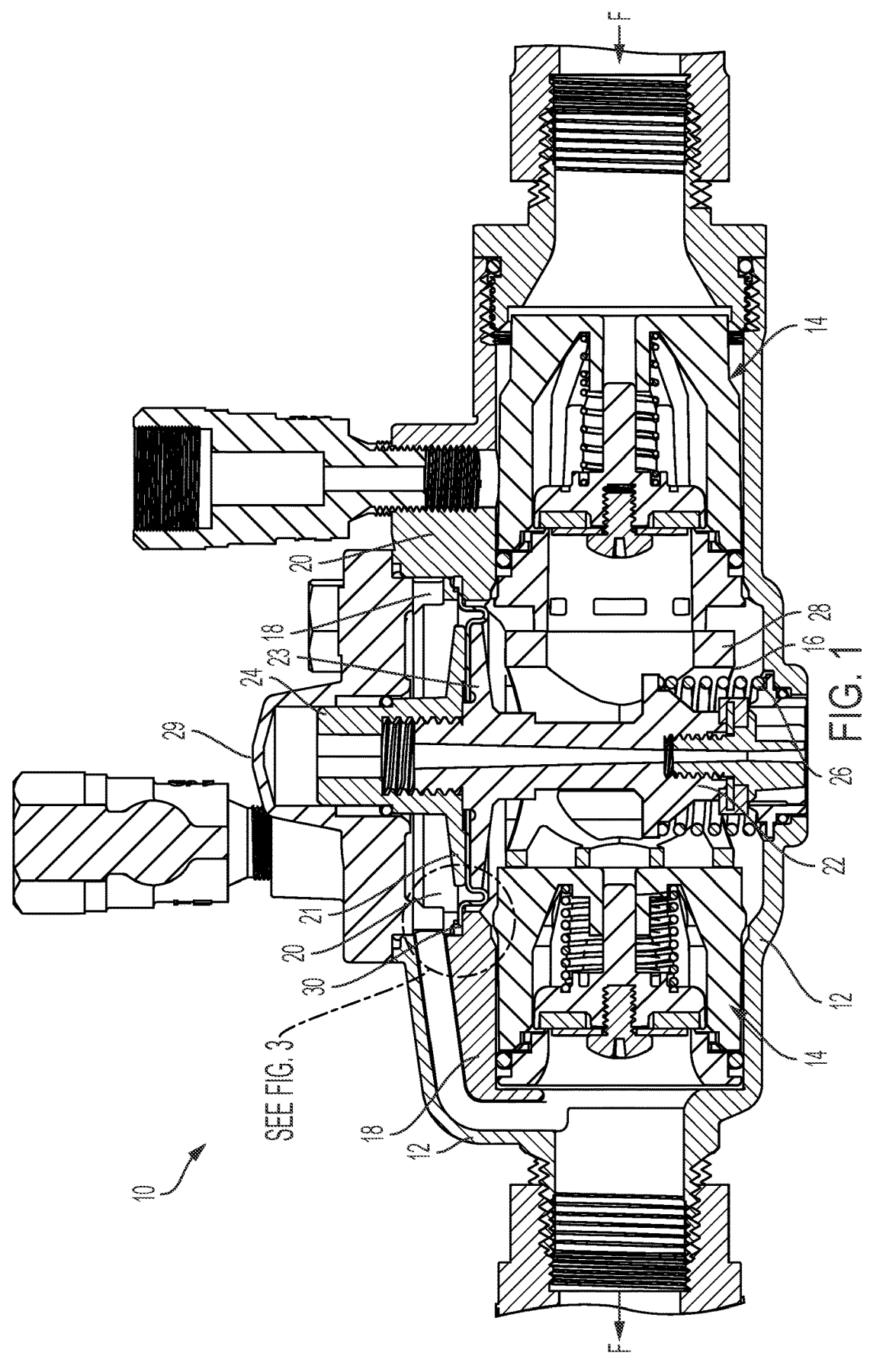
FIG. 1 is a cross-sectional side view of a relief valve of the present disclosure according to one embodiment or aspect.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

The terms "first", "second", and the like are not intended to refer to any particular order or chronology, but refer to different conditions, properties, or elements.

The term "includes" is synonymous with "comprises".

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

Figure 2:
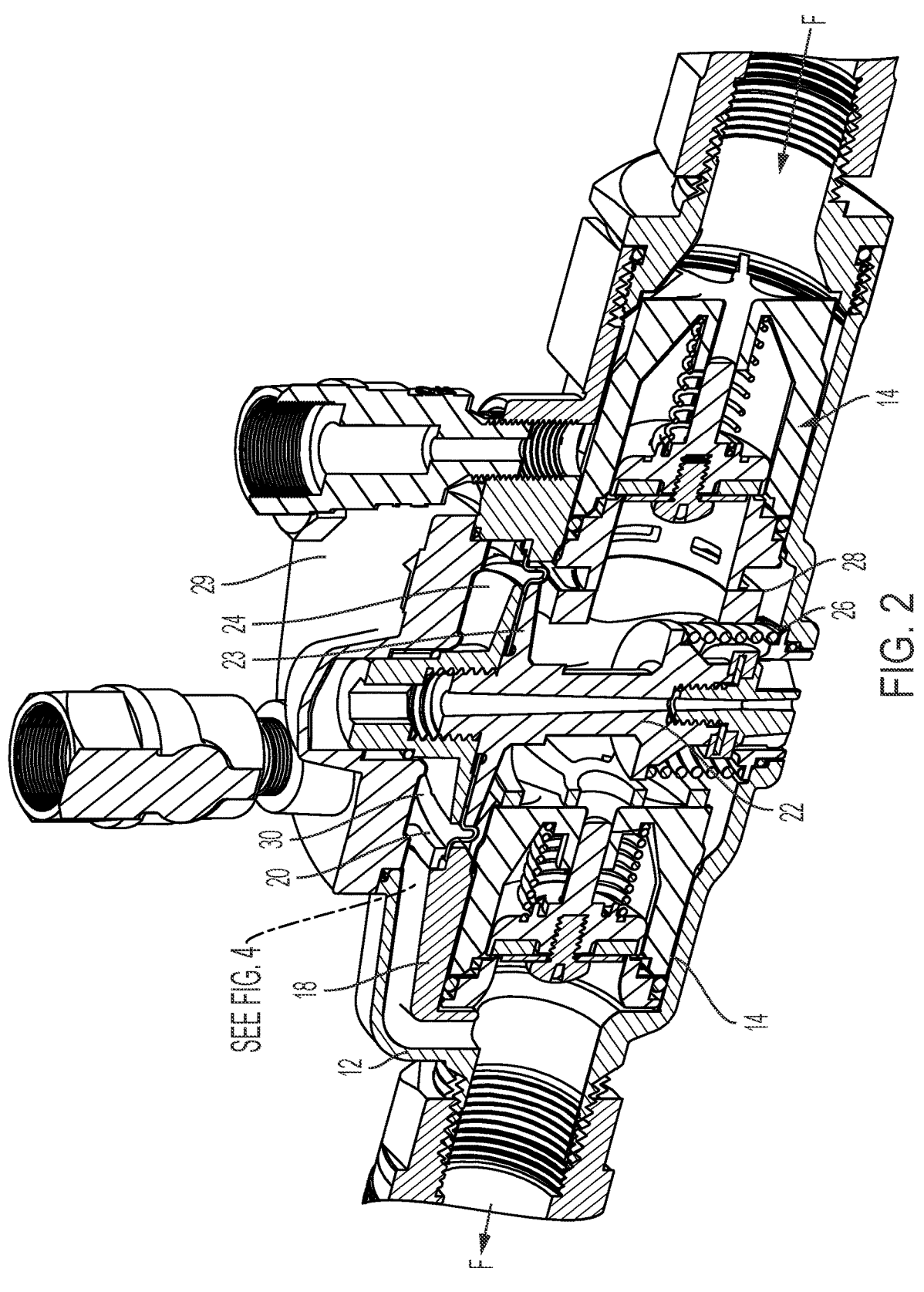
FIG. 2 is a cross-sectional perspective view of the relief valve of FIG. 1.

The present disclosure is directed to a relief valve assembly 10 for use in a piping or fluid flow system 2. In particular, the present disclosure is directed to a diaphragm 30 that is used in connection with the relief valve 10. The relief valve 10 defines a direction of fluid flow F (identified by the arrows shown in FIGS. 1 and 2). FIGS. 1 and 2 show the relief valve assembly 10, which is defined by a valve body 12, extending about an outer surface thereof and defining a longitudinal axis. Check valves 14 are disposed inside of the valve body to control fluid flow therein. The check valves 14 act in the direction of fluid flow F. Although check valves 14 are shown, other valves known to those having skill in the art may be used. A relief valve portion 16 extends vertically relative to the valve body 12. The relief valve portion 16 extends perpendicularly relative to the direction of fluid flow F. The relief valve portion 16 can be moved to grant or restrict fluid flow through the valve body 12 in a direction downstream of the relief valve portion 16.

The relief valve portion 16 may be defined by a lower valve body 18 and an upper valve body 20 disposed within the valve body 12. In particular a stem 22 extends from a top portion of the relief valve, so that the stem 22 may be received within the valve body 12 and upper and lower valve bodies 18, 20. The stem 22 can move up and down or rotate during use of the relief valve portion 16. This movement is actuated by a driving portion 24, which either urges the stem 22 downward or upward perpendicular to the direction of fluid flow F, or rotates the stem 22. The driving portion 24 receives part of the stem 22 therein and is connected to a motor, manual control system, or other device known to those having skill in the art. Extending from sides of the stem 22 can be gates 28, plates, or other members that can block the movement of fluid flow F through the valve body 12. For example, if the stem 22 moves upward and downward during use, the gates 28 can be arranged about the stem 22 to obstruct and not obstruct fluid flow depending on the elevation of the stem 22. If the stem 22 rotates, the gates 28 may be arranged to obstruct and not obstruct fluid flow depending on the rotational location of the stem 22. A lid 29 can be connected to the driving portion 24 and the valve body 12 to seal off the relief valve portion 14. A spring 26 is arranged proximate the bottom of the stem 22 in order to apply a force acting upwards on the stem 22, urging the step in the upward direction or otherwise supporting the stem 22 within the assembly 10. Other springs 26 can be used relative to the stem 22 to control its movement. As the stem 22 moves up and down, fluid flow is completely blocked, slightly blocked, or not blocked by the gates 28. The up and down movement of the stem 22 requires a diaphragm 30 to be displaced between the lower valve body 18 and the upper valve body 20 to prevent any fluid from leaking out of or through parts of the relief valve assembly 10. The diaphragm 30 defines an aperture 37 that fits the diaphragm 30 about the stem 22, and also forms a fluid tight connection between the lower valve body 18 and the upper valve body 20.

As shown in FIGS. 3-9, the valve diaphragm 30 is arranged between the lower valve body 18 and the upper valve body 20. The diaphragm 30 includes a body 32 that terminates with a first beaded end 34 and a second beaded end 64. The first beaded end 34 will be disposed directly between the lower valve body 18 and the upper valve body 20. The first beaded end 34 includes a bottom surface 36 that fits against the valve assembly 10. The bottom surface 36 is arranged to facilitate the fluid tight connection between the diaphragm 30 and the lower valve body 18. As shown, the bottom surface 36 is substantially flat to facilitate easy placement of the diaphragm 30 within the valve assembly 10, but other shapes may be used depending on the engagement with the lower valve body 18.

Figure 3:
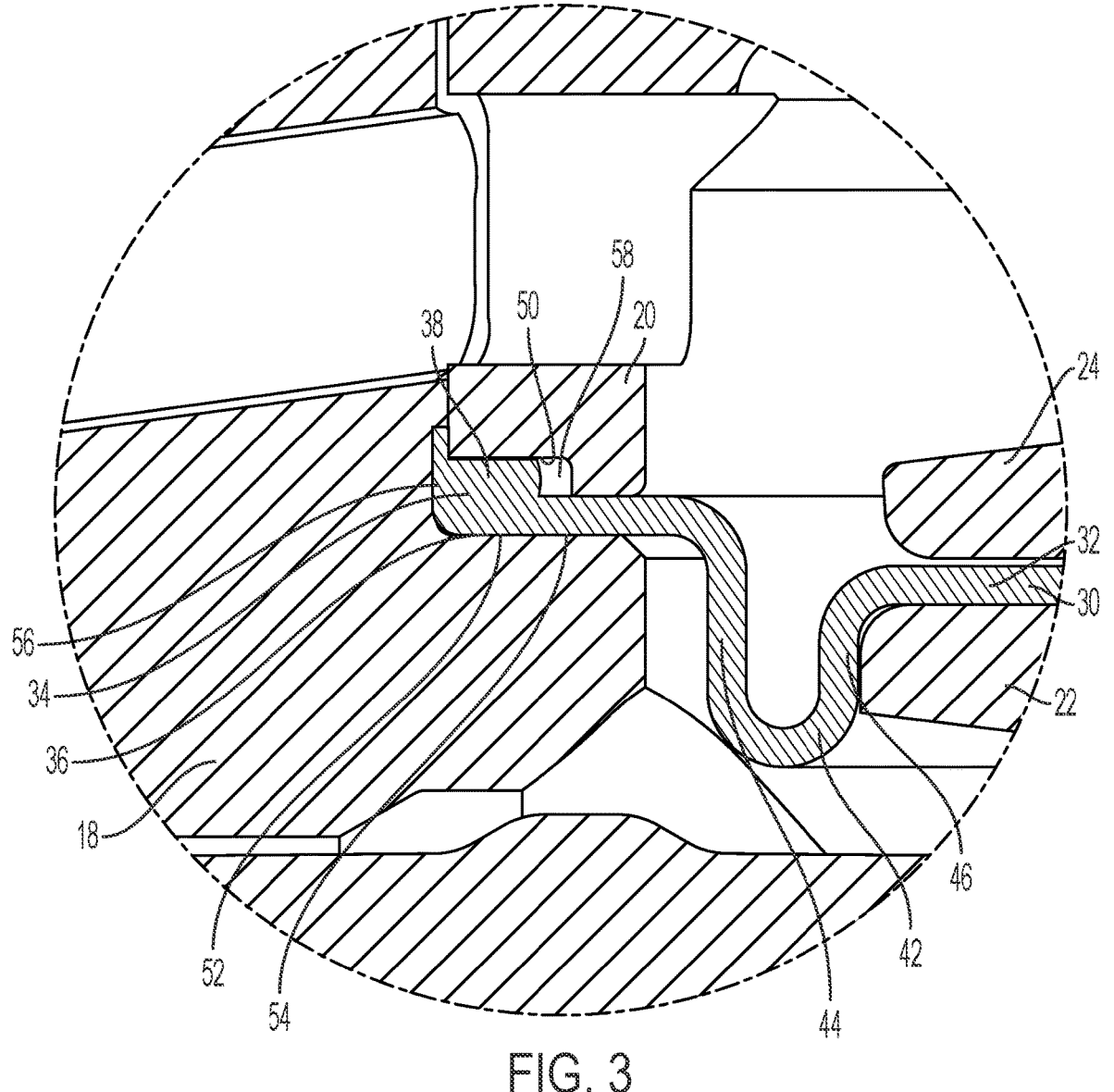
FIG. 3 is a cross-sectional view of portions of the relief valve identified in circle III in FIG. 1.

The first beaded end 34 also includes a bead or bulge 38 extending generally from the bottom surface 35 and terminating at a point on the beaded end 34 opposing the bottom surface 35. The bulge 38 is arranged to facilitate the fluid tight connection between the upper valve body 20 and the diaphragm 30. When arranged between the valve bodies 18, 20, the bulge 38 will compress downward and occupy the space formed between the valve bodies 18, 20, as shown in FIG. 3. The valve bodies 18, 20 are arranged so as to define a space 58 for the bulge, and this space 58 is big enough so that, when the bulge 38 is compressed by the upper valve body 20, there is still a space 58 remaining, now defined by the compressed bulge 38, the diaphragm body 30, and the upper valve body 20. In some embodiments, the bulge 38 may be compressed completely so as to fill the space defined by the valve bodies 18, 20. A tail 40 extends from the beaded end 34 proximate the bulge 38. The tail 40 is compressed against the lower valve body 18, so as to be compacted with the bulge 38. In some embodiments, there may be a small space formed between the lower valve body 18 and the upper valve body 20, and the tail 40 may be compressed between the valve bodies 18, 20 within this space to form the fluid tight seal.

To fit the diaphragm between the lower valve body 18 and the upper valve body 20, the lower valve body 18 and the upper valve body 20 must have complimentary features to the shape of the first beaded end 34. As noted above, the bulge 38 compresses when fit against the upper valve body 20, so the features of the lower valve body 18 and the upper valve body 20 that contact and interact with the first beaded end 34 do not need to be shaped precisely to compliment the shape of the first beaded end 34. In other words, the lower valve body 18 and the upper valve body 20 only need to be shaped so that the fluid tight seal is formed properly by the diaphragm 30 between the lower valve body 18 and the upper valve body 20. The relevant features of the upper valve body 20 include a step 50. The step 50 extends upward into the upper valve body 20 when viewing the assembled relief valve portion, as is shown in the figures. The step 50 extends into the upper valve body 20, so that the upper valve body 20 further defines a lip 51 that extends downward toward the lower valve body 18. The lip 51 is arranged to contact the diaphragm body 30, helping to define the space formed with the lower valve body 18 in which the first beaded end 34 is compressed.

The lower valve body 18 defines a corner 52. The corner 52 has a first portion 54 that is arranged to contact the bottom surface 36 of the first beaded end 34, and the corner 52 has a second portion 56 extending from the first portion 54, arranged to contact a side of the beaded end 34 that may include the bulge 38. The first portion 54 opposes the step 20, and the second portion 56 opposes the lip 51. The arrangements of these features define the space 58 prior to the reception of the first beaded end 34 within the space 58. As shown, the first portion 54 and the second portion 56 define a right angle therebetween, but other angles may be used. As the diaphragm is fit between the lower valve body 18 and the upper valve body 20, the first beaded end 34 is pressed into the corner 52, with the bottom surface 36 being pressed against the first portion 54 and the side of the beaded end 34 being pressed against the second portion 56. The action between the beaded end 34 and the portions 54, 56 of the corner 52 may further compress the beaded end 34 within the space 58, but the majority of the compression occurs via contact made by the upper valve body 20 and the first beaded end 34.

Figure 4:
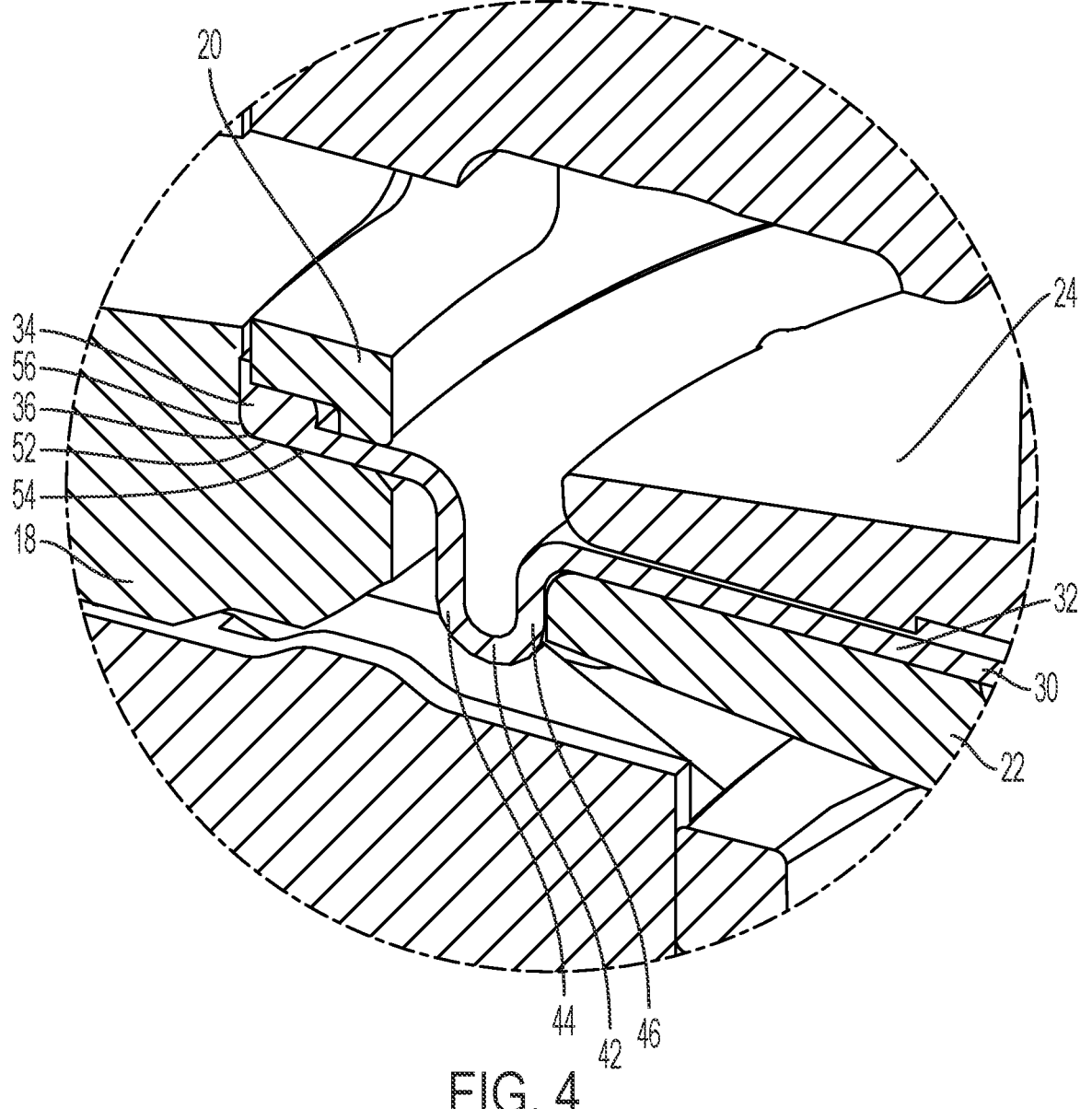
FIG. 4 is a cross-sectional view of portions of the relief valve identified in circle IV in FIG. 2.
Figure 5:
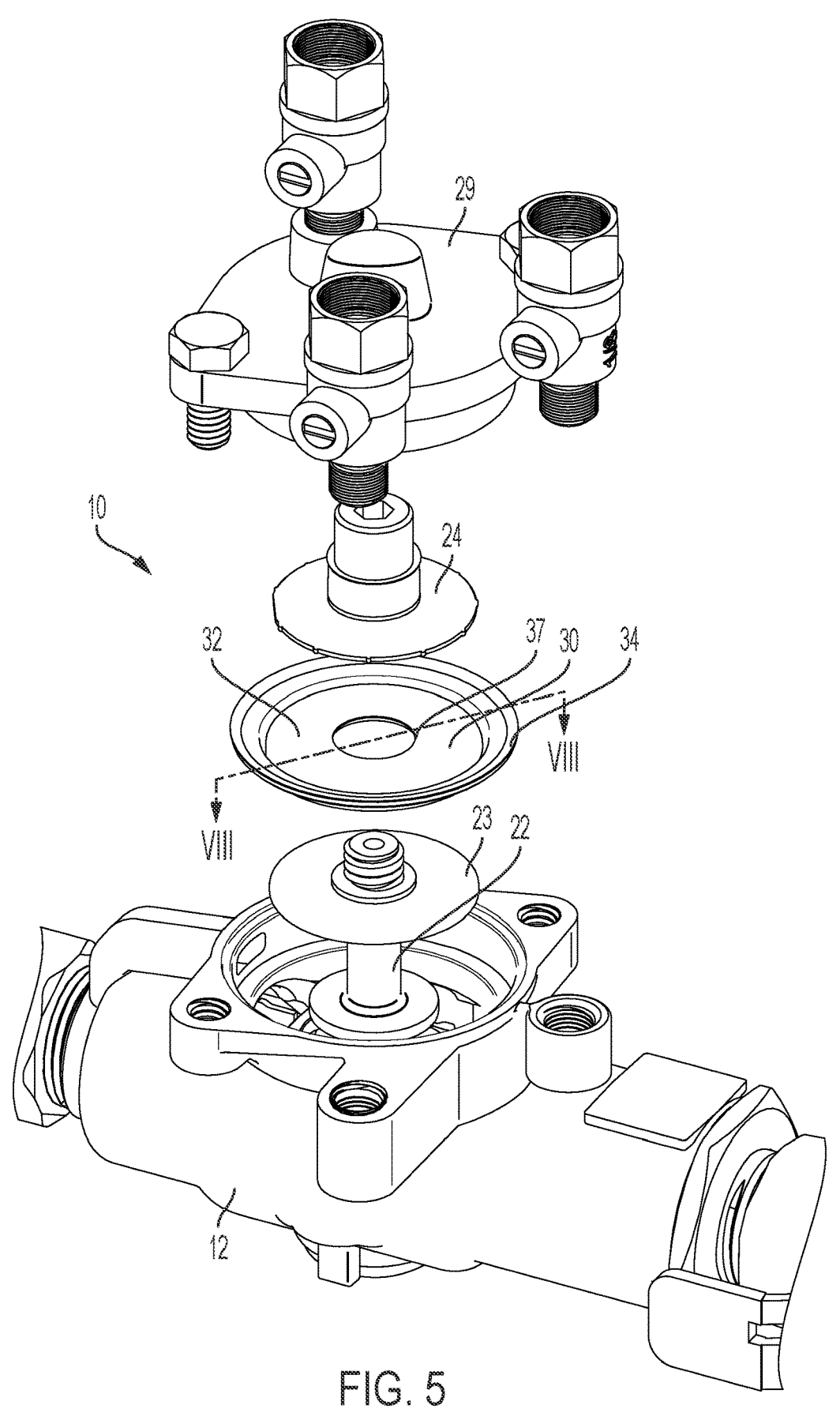
FIG. 5 is a partially exploded view of the relief valve of FIG. 1.
Figure 6:
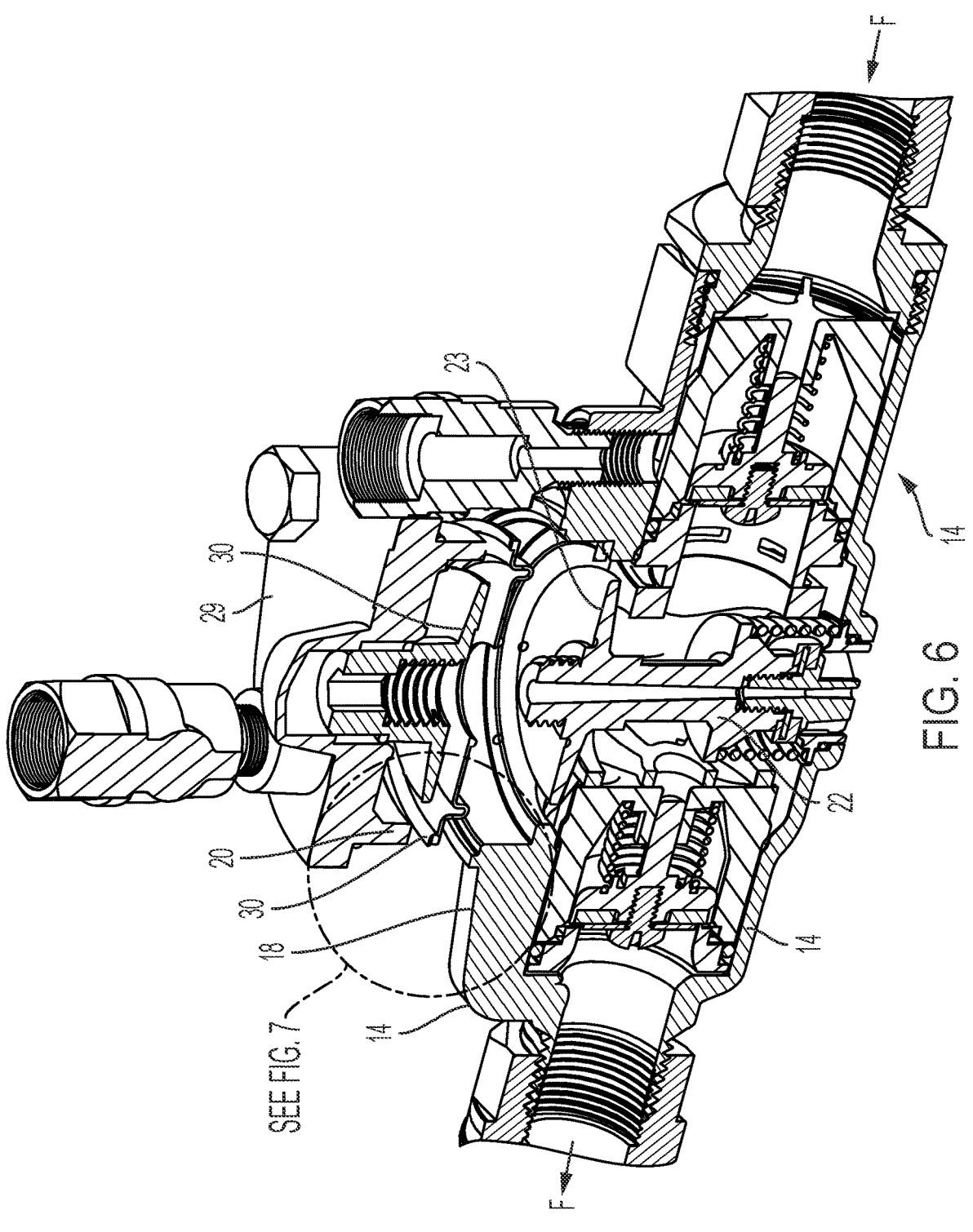
FIG. 6 is a partially exploded view of portions of the relief valve of FIG. 1.
Figure 7:
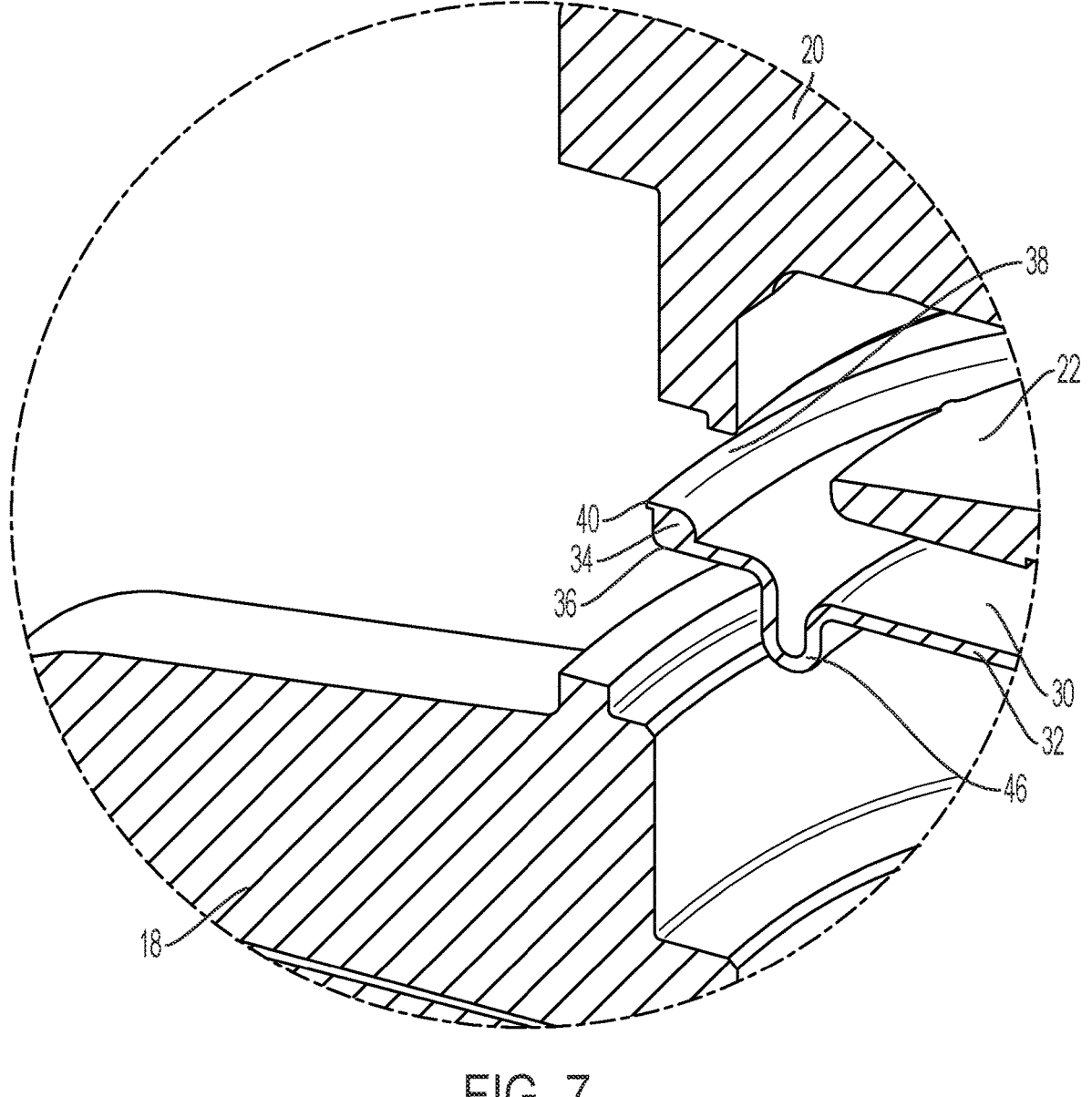
FIG. 7 is a partially exploded view of the relief valve of FIG. 1 as shown in circle VII.

Moving along the body 32 in a direction away from the beaded end 34, a U-shaped bend 42 is defined. The bend 42 includes a first side/leg 44 that extends downward relative to the first beaded end 34. A connecting portion 45 extends from the bottom of the first side/leg 44 and curves upward, so that the body 32 further extends upward along a second side/leg 46. The lengths of the sides 44, 46 are unequal, with the top first side 44 being located above the second side 46. The top of the first side 44 is on approximately the same level of the first beaded end 34 relative to the rest of the relief valve portion 16. The top of the second side 46 is some distance lower than the top of the first side 44, as shown in FIGS. 3 and 4. The first side 44 of the bend may contact a side of the lower valve body 18, and the second side 46 may contact a portion of the valve stem 22. The first side 44 is also disposed at a higher position relative to the second leg 46. Moving along the body 32 in a direction away from the first beaded end 34 and the bend 42, the diaphragm body 32 terminates with the second beaded end 64. The second beaded end 64 defines the aperture 37, so that the diaphragm 30 can be arranged about features within the valve relief portion 14, such as the stem 22, to create its fluid tight seal.

Figure 8:
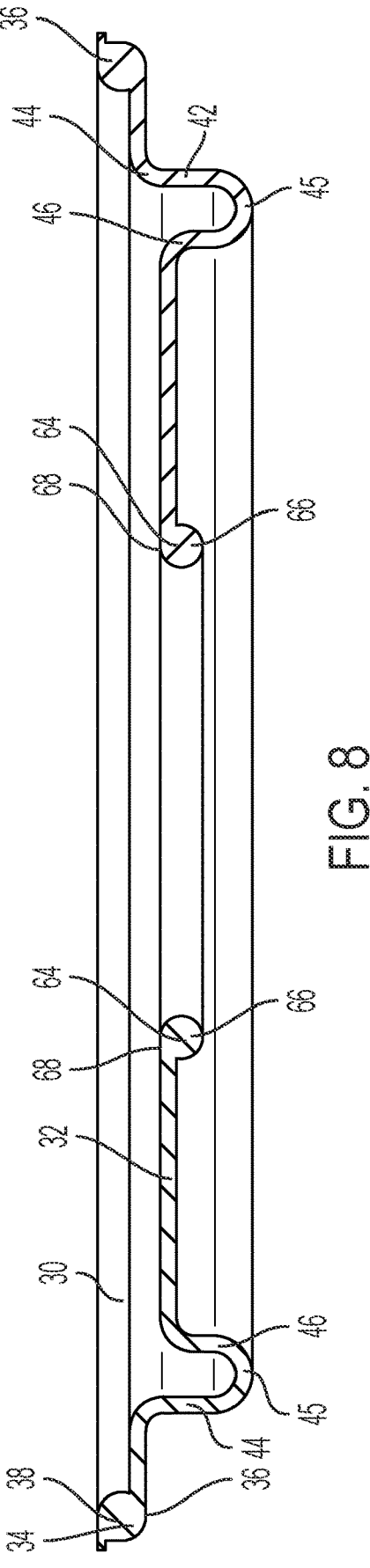
FIG. 8 is a cross-sectional view of the valve diaphragm of FIG. 5 taken along line VIII-VIII.

To complete the formation of the fluid tight seal, the second beaded end 64 must also be received within parts of the relief valve portion 16. In particular, the second beaded end 64 is arranged to be received within part of the valve stem 22 as shown in FIGS. 1, 2, 5, and 6. As shown, the second beaded end 64 is arranged relative to a flange 23 extending from a center part of the stem 22. As shown in FIG. 8, the second beaded end 64 also includes a rounded end 66. The rounded end 66 is similar to the bulge 38 in that it is pressed down into the flange 23 to create the fluid tight seal. The flange 23 may define a groove or slot to receive the second beaded end 64. In other words, the rounded end 66 extends from the second beaded end 64 into the direction of the flange 23. The bulge 38 of the first beaded end 34 extends in the opposite direction as the rounded end 66 of the second beaded end 64. The second beaded end 64 may also include an upper surface 68, which may be flat, similar to the bottom surface 36 of the first beaded end 34. As shown, the beaded ends 34, 64 take the same shape, but relative to the diaphragm body 32, the beaded ends 34, 64 are flipped about a horizontal. To create the fluid tight seal with respect to the second beaded end 64, the driving portion 24 is arranged over the diaphragm 30, pressing the second beaded end 64 into the flange 23.

The fluid tight seal is formed (or reformed if conducting maintenance) by aligning the diaphragm 30 about the lower valve body 18 and stem, so that the first beaded end 34 is aligned with the corner 52, the stem 22 is received within the aperture 37, and the second beaded end 64 is aligned with the groove within the flange 23. Then, a cap 25 is placed about the stem 22, so that it presses down on the diaphragm 30. The upper valve body 20 can then be arranged relative to the diaphragm 30, so that the first beaded end 34 is aligned with the step 50 and the bulge 38 is ultimately compressed by the step 50.

While specific embodiments of the devices of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. A valve diaphragm for a relief valve, the valve diaphragm comprising:
   a body comprising a first beaded end and a second beaded end, the first beaded end comprising:
      a bottom surface;
      a side surface; and
      a bulge extending from the bottom surface and the side surface,
   wherein the bottom surface is configured to contact a first portion of a corner of a lower valve body,
   wherein the side surface is configured to contact a second portion of the corner of the lower valve body, the second portion extending perpendicular to the first portion,
   wherein the bulge is configured to contact a step of an upper valve body,
   wherein the contact between the bottom surface and the first portion of the corner, the contact between the side surface and the second portion of the corner, and the contact between the bulge and the step are configured to create a fluid tight seal between the upper valve body and the lower valve body,
   wherein the fluid tight seal is created such that a single empty space is defined between the first beaded end and the step on a side of the first beaded end opposite the second portion of the corner,
   wherein the body is compressible, such that the step is configured to compress the bulge toward the bottom surface,
   wherein the body further comprises a tail extending from the first beaded end proximate the bulge, and
   wherein the tail is configured to contact at least the second portion of the corner to create the fluid tight seal.

2. The relief valve of claim 1, wherein, in an uncompressed state, the tail extends radially in a direction away from the bulge.

3. The valve diaphragm of claim 1, wherein the tail is configured to contact the step to create the fluid tight seal.

4. The valve diaphragm of claim 3, wherein the second portion of the corner is configured to compress the tail into the first beaded end.

5. The valve diaphragm of claim 1, wherein the second beaded end is configured to contact a portion of a valve stem.

6. The valve diaphragm of claim 5, wherein the second beaded end comprises a rounded end extending in a direction opposite that of the bulge.

7. The valve diaphragm of claim 1, wherein the body defines a U-shaped bend between the first beaded end and the second beaded end.

8. The valve diaphragm of claim 7, wherein the U-shaped bend defines a first level and a second level, the first level being arranged higher than the second level, and
   wherein the first beaded end is located at the first level, and the second beaded end is located at the second level.

9. The valve diaphragm of claim 8, wherein at least a portion of a first side of the U-shaped bend contacts the lower valve body.

10. The valve diaphragm of claim 9, wherein at least a portion of a second side of the U-shaped bend contacts a valve stem.

11. The valve diaphragm of claim 10, wherein the second side opposes the first side.

12. A relief valve comprising:

an upper valve body;

a lower valve body at least partially defining a fluid flow path;

a stem configured to move between the upper valve body and the lower valve body, the stem at least partially extending into the fluid flow path; and a diaphragm disposed between the upper valve body and the lower valve body, the diaphragm comprising a body having a first beaded end and a second beaded end, the body defining an aperture to receive at least a portion of the stem therethrough, wherein the first beaded end comprises:

a bottom surface;

a side surface; and a bulge extending from the side surface and the bottom surface, wherein the bottom surface is configured to contact a first portion of a corner defined in the lower valve body, wherein the side surface is configured to contact a second portion of the corner, the second portion extending perpendicular to the first portion, wherein the bulge is configured to contact a step defined in the upper valve body, wherein the upper valve body and the lower valve body are arranged such that the contact between the first portion of the corner and the bottom surface, the contact between the second portion of the corner and the side surface, and the contact between the bulge and the step are configured to create a fluid tight seal between the upper valve body and the lower valve body, and wherein the fluid tight seal is created such that a single empty space is defined between the first beaded end and the step on a side of the first beaded end opposite the second portion of the corner.

13. The relief valve of claim 12, wherein the second beaded end is configured to be received within a portion of the valve stem.

14. The relief valve of claim 12, wherein the body defines a U-shaped bend between the first beaded end and the second beaded end, the U-shaped bend defining a first level and a second level, the first level arranged higher than the second level, and wherein the first beaded end is located at the first level, and the second beaded end is located at the second level.

15. The relief valve of claim 12, wherein the diaphragm is compressible, such that the step compresses the bulge toward the lower valve body.

16. The relief valve of claim 15, wherein the body further comprises a tail extending from the first beaded end proximate the bulge, and wherein the tail is configured to contact at least the second portion of the corner to create the fluid tight seal.

17. The relief valve of claim 16, wherein the tail is configured to be compressed between the second portion of the corner and the step.

\* \* \* \* \*